2 Sheets-Sheet 1.

J. M. & S. F. Stanton,

Saw-Mill Head-Block.

No. 2,924. Reissued May 5, 1868.

Witnesses:

Wm. E. Lyon

Hen Lusch

Inventor:

J. M. & S. F. Stanton

Munn & Co

Attorneys

N. PETERS. PHOTO-LITHOGRAPHER, WASHINGTON, D. C.

2 Sheets-Sheet 2.

J. M. & S. F. Stanton,
Saw-Mill Head-Block.

No. 2,924. Reissued May 5, 1868.

Witnesses:

Wm. E. Lyon

Theo Lusch

Inventor

J. M. & S. F. Stanton

Munn & Co

Attorneys

N. PETERS, PHOTO-LITHOGRAPHER, WASHINGTON, D. C.

United States Patent Office.

SIMON F. STANTON, OF MANCHESTER, NEW HAMPSHIRE, ASSIGNEE OF J. M. STANTON AND S. F. STANTON, OF SAME PLACE.

*Letters Patent No.* 54,432, *dated May* 1, 1866; *reissue No.* 2,924, *dated May* 5, 1868.

IMPROVEMENT IN HEAD-BLOCKS FOR SAW-MILLS.

The Schedule referred to in these Letters Patent and making part of the same.

TO ALL WHOM IT MAY CONCERN:

Be it known that J. M. STANTON and SIMON F. STANTON, of Manchester, in the county of Hillsborough, and State of New Hampshire, have invented certain Improvements in Saw-Mills; and I, SIMON F. STANTON, assignee of all right and title thereto, do hereby declare that the following is a full and exact description thereof, reference being had to the accompanying drawings, making part of this specification—

Figure 1:
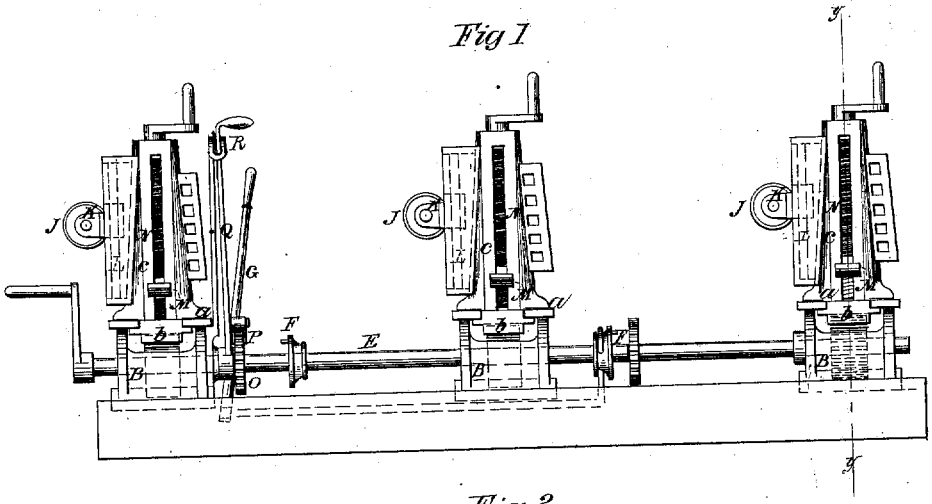

Figure 1 being a front elevation of part of a saw-mill carriage, having the carriage-blocks thereon provided with the improvements.

Figure 2:
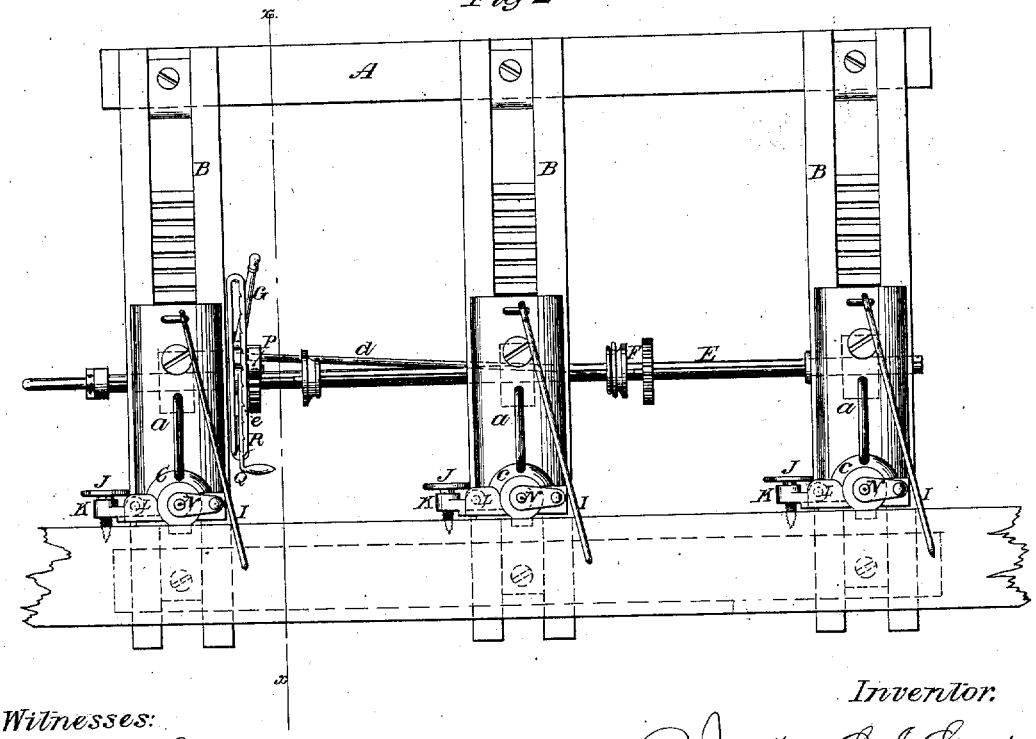

Figure 2, a plan of the same.

Figure 3:
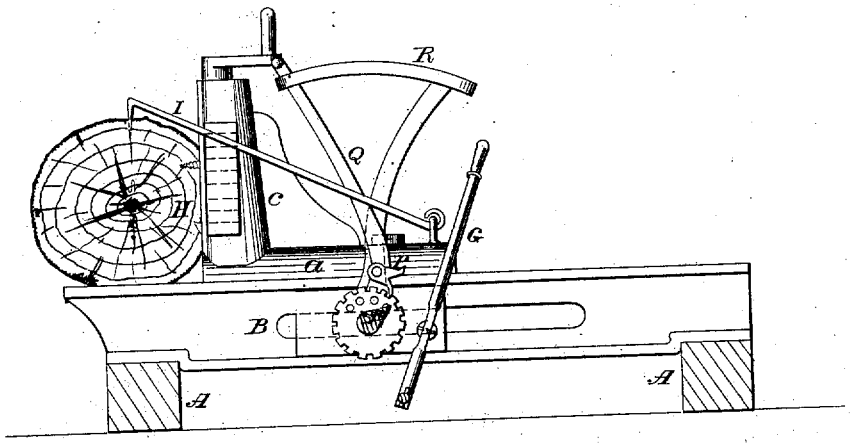

Figure 3, a transverse vertical section thereof, in a plane indicated by the line *x x*, fig. 2.

Figure 4:
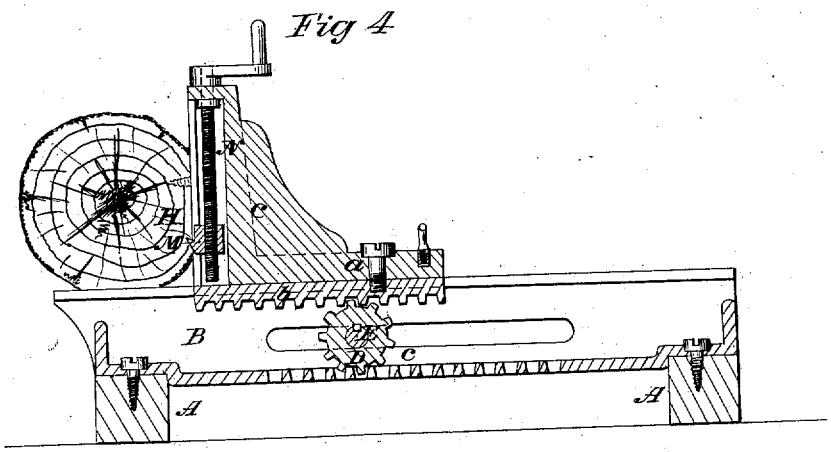

Figure 4, a transverse vertical section of the same, in a plane indicated by the line *y y*, fig. 2.

Like letters designate corresponding parts in all of the figures.

The leading feature of this invention consists in the employment of a notched guide, and single lever, pawl and ratchet-wheel, whereby the uprights or knees are moved and adjusted on the carriage-blocks simultaneously or separately, and by which the exact distances which they are moved or adjusted, whether varied or not, are determined and indicated without measurement, arranged and operating substantially as hereinafter set forth.

Let A, in the accompanying drawings, represent a portion of a saw-mill carriage, B B B the head, tail, and middle blocks thereof, and C C C the respective knees or uprights, to be movable and adjustable upon the said carriage-blocks. The carriage-blocks are provided with suitable ways, in which the bases *a a a* of the uprights move. The form and construction of the blocks and uprights may be as represented, and they may be made of iron.

On the lower side of the base, *a*, of each upright, is a rack, *b*, and in or on the bottom of each carriage-block B is a corresponding rack, *c*, there being space enough between the two to admit a pinion, D, so that it will gear into both racks at the same time.

Through the several pinions extends a shaft, E, having a longitudinal groove (or its equivalent) in one side, to receive coupling-keys, by which the pinions may be adjusted and secured anywhere upon its length. This shaft is divided into sections between the several carriage-blocks, and there are clutches, F F, to couple any or all of these sections together, or uncouple them, as required, so that, on turning the shaft, only the pinion of the head-block may be revolved, or that of the middle block also, or all together. Each clutch may be operated by a lever, G, and connecting-rod *d*, or any other suitable means.

By turning the shaft E, or any section or sections thereof, the pinions D D D, or any such number of them as may be attached to the revolving section or sections of the shaft, will turn and travel on their respective racks *c c c* at the bottoms of the carriage-blocks, and they will also move along the uprights C C C, by gearing into the racks *b b b*, as much faster as they themselves travel.

The shaft travels sidewise with the pinions, and there are slots in the sides of the carriage-blocks, through which the shaft extends, being long enough to allow as much side movement of the shaft as may be required.

Hence, on turning the shaft E, the uprights B B B, or as many of them as are set in motion by the shaft, are moved on their blocks simultaneously and equally, and they move the log or timber (which is secured thereto) along with them.

For simple adjustment, or for moving the uprights back into place to start again, after a log is sawed, the shaft E may be turned by a crank attached to one end thereof, as seen in figs. 1 and 2.

But the essential feature of this invention lies in turning this shaft determinate distances, so as to set the logs to be sawn into the required thicknesses, by simply moving a vibratory lever certain distances, which determine and indicate the distances which the uprights and, with them, the logs, are moved.

To accomplish this, a vibratory lever, Q, is located by the head-block, being pivoted around or concentric with the shaft E, and by means of a ratchet-wheel, O, on the shaft, and pawl F on the lever, the vibrations of the latter turn the former with an intermittent motion. By making the teeth of the ratchet-wheel abrupt both ways, and the pawl P double, and adjustable to either direction, the vibrations of the lever will move this shaft either one way or the other, according to the position of the pawl.

And in connection with this vibratory lever, is employed a stationary guide, R, supported by a suitable standard on the head-block, in a position near the upper end of the lever. It is also preferably concentric, in form, with the arc-movement of the lever, and of sufficient extent to serve as a guide to the lever throughout its utmost vibrations. It is also better to have the lever move through a slot in the guide, to keep it in position, and limit the full extent of its movements.

In one edge of the guide R is a set of notches, (or equivalent means of both accurately indicating and limiting the movements of the lever,) at such certain and exact distances apart, that a movement of the lever from one to another, or to the extent of any given number of intervals between notches, or from any notch to the end of the guide-slot or extreme limit of the lever, it will move and set the uprights, and consequently the log, to saw a given thickness, as determined and indicated by said notches.

The lever is formed to fit into the notches, and a spring is, or may be, used, as represented, to hold it therein, but there is sufficient side-play allowed the lever to enable it to be withdrawn from the notches, and moved from one to another.

In first adjusting a log upon the blocks, the uprights may be arranged in line, or out of line, if the log is crooked and requires it, by the use of the shaft-sections and clutches above described.

The logs, represented at H, figs. 3 and 4, may be secured to the uprights by hook-dogs, I I I, of ordinary construction, and hinged as shown.

But an additional feature of improvement consists in the employment of screws J J J, one for each upright, at one side thereof, the nut K of each screw both turning and sliding up and down on a vertical rod, L, secured to the upright. Thus these screws can be screwed into the log at any height, and into its side, where it will not be in the way of the saw, till the log is entirely sawed up.

Another set of dogs is also driven into the back side of the log, through square holes in one side of the uprights, as shown in figs. 1 and 3. These holes being at different heights, the dogs may be driven into such of them as will best hold the log.

Another feature of my invention consists in the employment of clamp-hooks or dogs M M M, one in front of each upright, there being a slot or groove therein for the clamp-hooks to slide up and down in, as represented. The rear ends or shanks of the clamp-hooks are formed as nuts, through which screws N N N pass. The said screws have bearings in the uprights, and are turned by cranks, so as to draw the clamp-hooks upward, and thereby hold and sustain the log in position, if required. The logs may be even supported thereby, thus avoiding friction of the logs on the blocks in setting the uprights.

What I claim as the aforesaid invention, and desire to secure by Letters Patent, is—

The combination and arrangement of the pinions D D D, and double sets of racks *b b b*, *c c c*, for moving the uprights by the turning of the shaft E, substantially as herein set forth.

I also claim the arrangement of the shaft E in sections, coupled together by clutches F F, so as to be connected or disconnected, at pleasure, constructed and operating substantially as and for the purpose herein specified.

I also claim the notched guide R, in combination with the lever Q, which actuates intermediately the pawl P, ratchet-wheel O, shaft E, pinions D D D, and racks *b b b*, or the equivalent thereof, for moving the uprights different and determinate distances, constructed and operating substantially as herein specified.

I also claim the clamp-hooks or dogs M M M, arranged and operated substantially as and for the purpose herein set forth.

In witness that the above is a true specification of the said invention, I hereunto set my hand, this sixth day of June, 1867.

SIMON F. STANTON.

Witnesses:

S. N. Bell,

J. S. Brown.